United States Patent
Hylton

(10) Patent No.: US 9,235,852 B2
(45) Date of Patent: Jan. 12, 2016

(54) DISTRIBUTING CONTENT

(71) Applicant: Google Inc., Mountain View, CA (US)

(72) Inventor: Jeremy Hylton, Easton, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/464,859

(22) Filed: Aug. 21, 2014

(65) Prior Publication Data

US 2014/0358701 A1    Dec. 4, 2014

Related U.S. Application Data

(63) Continuation of application No. 12/696,583, filed on Jan. 29, 2010, now Pat. No. 8,843,465.

(51) Int. Cl.
G06F 17/30    (2006.01)
G06Q 30/02    (2012.01)

(52) U.S. Cl.
CPC ........ G06Q 30/0277 (2013.01); G06F 17/3064 (2013.01); G06F 17/30864 (2013.01); G06Q 30/02 (2013.01)

(58) Field of Classification Search
CPC .............. G06F 17/30; G06F 17/30864; G06F 17/3064; G06F 17/30876; G06Q 30/0251; G06Q 30/0277
USPC .................. 707/707, 731, 721, 722
See application file for complete search history.

(56) References Cited

U.S. PATENT DOCUMENTS

| | | | |
|---|---|---|---|
| 2006/0259861 A1* | 11/2006 | Watson | 715/705 |
| 2007/0078822 A1* | 4/2007 | Cucerzan et al. | 707/3 |
| 2008/0133482 A1 | 6/2008 | Anick | |
| 2008/0275753 A1 | 11/2008 | Protheroe | |
| 2009/0254633 A1 | 10/2009 | Olive | |
| 2010/0094878 A1 | 4/2010 | Soroca | |
| 2010/0198772 A1 | 8/2010 | Silverman | |

FOREIGN PATENT DOCUMENTS

| | | |
|---|---|---|
| WO | WO0150399 A9 | 7/2002 |
| WO | WO2009026255 A1 | 2/2009 |
| WO | WO2009108732 A3 | 11/2009 |

OTHER PUBLICATIONS

Notification of Transmittal of the International Search Report and the Written Opinion of the International Searching Authority, or the Declaration issued in PCT/2011/023106 on Apr. 28, 2011, 11 pages.
Notification Concerning Transmittal of International Preliminary Report on Patentability issued in PCT/2011/023106 on Aug. 9, 2012, 8 pages.
Office Action in Australian Application No. 2011210611, mailed Jul. 28, 2014, 3 pages.
Office Action issued in U.S. Appl. No. 12/696,583 on Apr. 26, 2013, 19 pages.

(Continued)

*Primary Examiner* — Vincent F Boccio
(74) *Attorney, Agent, or Firm* — Fish & Richardson P.C.

(57) ABSTRACT

Contextually relevant pieces of alternative content, including advertisements, are selected for display with requested content based on documents or other second content sources that are referenced by or in the requested content.

21 Claims, 4 Drawing Sheets

(56) References Cited

OTHER PUBLICATIONS

Office Action issued in U.S. Appl. No. 12/696,583 on Nov. 7, 2013, 16 pages.

Notice of Allowance issued in U.S. Appl. No. 12/696,583 on May 23, 2014, 5 pages.

* cited by examiner

DISTRIBUTING CONTENT

CROSS-REFERENCE TO RELATED APPLICATION

This application is a continuation of U.S. application Ser. No. 12/696,583, filed Jan. 29, 2010, the contents of which is incorporated by reference.

TECHNICAL FIELD

This disclosure relates to distributing content.

BACKGROUND

In many different environments, content providers want to distribute content to selected individuals for review. For example, advertisers want to distribute their advertisements where the advertisements will be effective in communicating information to receptive recipients, and at times when the advertisements will lead to desired activity, such as a purchase of the advertiser's goods or services. In some instances, a content provider may rely on contextual information when making decisions regarding content distribution selections. For example, an advertiser may want to advertise goods and/or services relating to travel where information of general interest to travel enthusiasts is available. In some instances, a content provider may rely on targeting information, such as demographic information of recipients, when selecting content for distribution. Additionally, content providers can rely on performance information regarding results achieved by previous content distribution selections.

SUMMARY

In order to effectively distribute content to locations based on contextual relevance, the context of content at a candidate content distribution location must be known. In many situations, such as when the content at a candidate content distribution location is new, or when the context of the content changes, the current context of the content at the candidate content distribution location may not be known at a time when a decision regarding selection of content for distribution to the candidate content distribution location is made. In such situations, it may not be possible to select content for distribution to the candidate content distribution location based on contextual relevance, or the effectiveness of content selection may be reduced. However, if the current context of a candidate content distribution location is known, then contextually-relevant content can be selected for distribution to the candidate content distribution location.

For example, in Internet advertising, many web pages include space reserved for the display of advertisement creatives, including text, audio, and/or video advertisements, which are selected at or near a time when a visitor requests to view a copy of the web page. If the web page is a search results page created by a search engine provider, a page that includes current news headlines, or another page that includes new or frequently-changing content, the current context of the page content may not be known. Particularly for very broad searches, or pages with broad topics, which could encompass many different contexts over time, an advertisement server may not be able to select contextually-relevant advertisements for display along with the search results, or the selected advertisements may be poorly matched to the interest of the user to whom they are displayed and/or to the current context of the page content. For example, the current context of an Internet search query for the name of a company might relate to one of the company's products at a first time, and relate to another one of the company's products at another time. Similarly, the current context of the company's home page might change over time, such as when a new product is released.

In some implementations, the current context of content at a location where alternative content can be distributed, such as a web page with space reserved for advertisements, is determined based on content which is related to the content at the location, such as by a reference included in the content at the location. For example, in an Internet search environment, the search results page includes an ordered list of search results. Each of the search results includes a hypertext link or other navigational tool or reference to a relevant document. One or more of the linked documents can be used to determine the current context of the search results page for use in selecting advertisements to display along with the search results on the search results page.

For example, advertisements, or other pieces of content, which were previously selected as contextually-relevant to the linked document are likely to be contextually-relevant to the content of the search results page and are likely to be indicative of current context of the overall content of the search results page. In some implementations, the advertisements, or other content, previously selected for each document linked to the search results included in the search results page can be identified as candidate pieces of content for distribution to the search results page. For example, the advertisements most frequently selected as contextually-relevant to the linked documents may be selected as being the most relevant to the current context of the search results page.

In another example, the content of the linked documents can be used to identify keywords or phrases which are relevant to the current context of the search results page. The most common keywords or phrases identified from the linked documents can be used to select advertisements, or other pieces of content, that are contextually-relevant to the search results page. The selected content can then be distributed to the search results page.

In one general aspect, distributing content includes receiving, by at least one processor, a request for alternative content based on a request for content, identifying, by at least one processor, a current context of the requested content based on second content referred to by the requested content, selecting, by at least one processor, alternative content based on the identified current context of the requested content, and transmitting the selected alternative content in a response to the request for alternative content.

Implementations may include one or more of the following features. For example, identifying the current context of the requested content includes receiving a list of search results and identifying alternative content previously identified as contextually-relevant to the search results. Selecting the alternative content includes selecting alternative content from among the alternative content previously identified as contextually-relevant to the search results. Identifying alternative content previously identified as contextually-relevant to the search results includes retrieving and aggregating alternative content associated with a landing location identified in the search results. Selecting alternative content from among the alternative content previously identified as contextually-relevant to the search results includes selecting from among the alternative content based on at least one of a relative frequency of retrieval of the alternative content and a relative ranking of the search result to which the alternative content is contextually-relevant. Identifying the current context of the requested content includes receiving content summary information that summarizes the content of a list of search results, and selecting alternative content includes identifying alternative content that is contextually-relevant to the content summary information and selecting alternative content from among the identified alternative content. Identifying alternative content that is contextually-relevant to the summary information includes generating a search query based on the content summary information and selecting alternative content based on the search query. Identifying the current context of the requested content includes receiving a list of search results, and selecting alternative content includes identifying a search query that produced similar search results and selecting alternative content based on the identified search query. Identifying the current context of the requested content includes generating a search query based the content, and selecting alternative content includes selecting alternative content based on the generated search query. The alternative content includes an advertisement.

In one general aspect a system for distributing content includes a receiver that receives a request for alternative content based on a request for content, a current context analyzer that identifies the current context of the requested content based on second content referred to by the requested content, a processor that selects alternative content based on the identified current context of the requested content, and a transmitter that transmits the selected alternative content in response to the request for alternative content.

Implementations may include one or more of the following features. For example the current context analyzer includes a search query generator generating a search query based on the requested content. The current context analyzer includes a storage device storing contextually-relevant alternative content selections for pieces of content. The current context analyzer includes a keyword generator that generates keywords based on text content.

In one general aspect, distributing content includes receiving, by at least one processor, a request for search results, generating, by at least one processor, a ranked list of search results that are responsive to the request for search results, identifying, by at least one processor, a current context of the search results based on content located at landing locations of links associated with the search results, selecting, by at least one processor, advertisements for display with the search results based on the identified current context of the search results, and transmitting the search results and the selected advertisements in a response to the request for search results. The current context is identified by at least one of identifying advertisements that were previously determined to be contextually-relevant to the content located at one or more landing locations and identifying keywords that are related to content located at one or more landing locations. Identifying keywords that are related to content located at one or more landing locations includes generating a summary of the content located at one or more landing locations and selecting keywords from among terms and phrases included in the summary.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
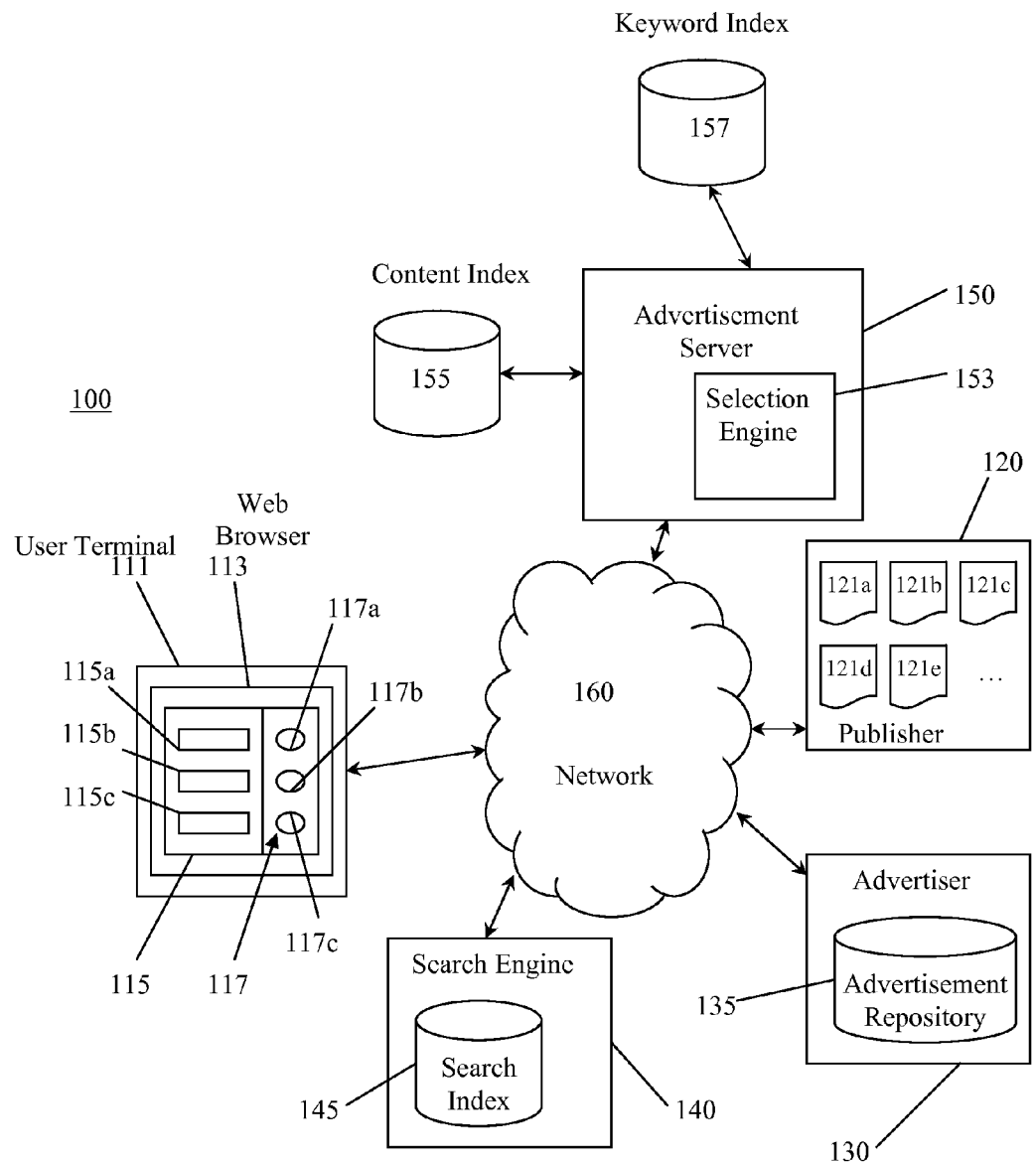
FIG. 1 is a diagram illustrating a system for distributing content.

With reference to FIG. 1, a system 100 for distributing content includes a user terminal 111 to which content is distributed, and a publisher 120 that provides content 121a-121e, such as web pages, that include space to which alternative content can be distributed. A search engine provider 140 is operable to assist users in finding desired content in response to user-generated search queries using a search index 145 stored on one or more storage devices. The system 100 also includes a content provider 130, such as an advertiser, that provides alternative content for distribution to users, and a content server 150 for selecting alternative content distribution to available spaces included in publishers' content, or other requested content.

Figure 7:
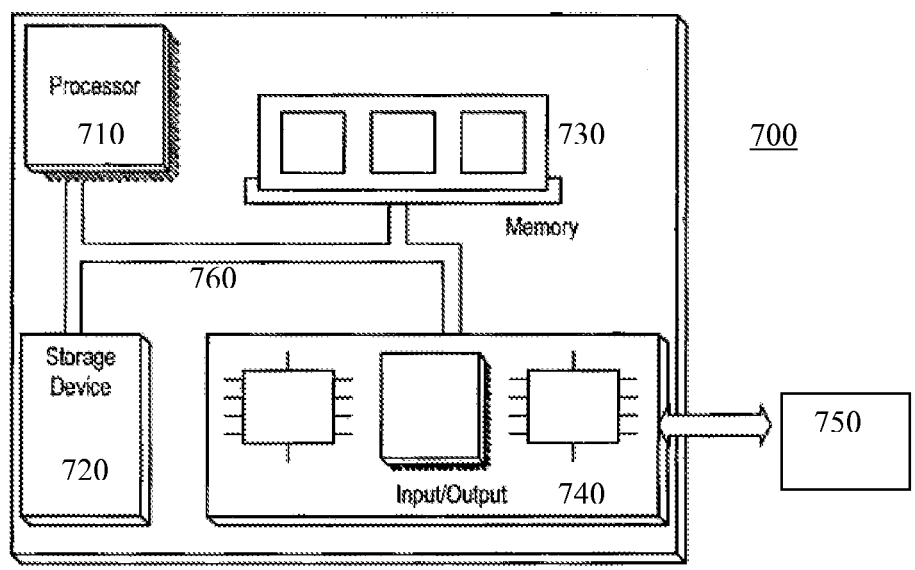
FIG. 7 is a diagram illustrating a computer system operable in the system of FIG. 1.

One or more of the components of the system 100, such as the user terminal 111, the publisher 120, the content provider 130, the search engine provider 140, and/or the content server 150, can include one or more computer systems, such as the computer system 700 of FIG. 7. The computer system 700 includes a processor 710, memory modules 730, a storage device 720, and an input-output module 740 connected by a system bus 760. The input-output module 740 is operable with one or more input and/or output devices 750, including a communication device for operable connection with a network 160 and with the other components of the system 100. The one or more computer systems 700 can perform the various functions of the components of the system 100 by executing computer-readable instructions, such as computer software stored on a computer-readable storage device.

The user terminal 111 can include a personal computer, a mobile device, and/or another computing device capable of communicating with the publisher 120, the content provider 130, the search engine provider 140, and/or the content server 150 via the network 160 and capable of displaying content, including selected alternative content, to a user. In some implementations, the user terminal 111 includes a user interface 113, such as an Internet browser program, that is operable to output a display to the user and/or to receive inputs from the user, such as keystrokes, pointer clicks, voice commands, and/or another inputs. The display of the user interface 113 includes a first area 115 for display of content 115a-115c from a first source, such as search results provided by the search engine provider 140 or the a web page 121a provided by the publisher 120. The display of the user interface 113 also includes a second area 117 for display of content 117a-117c from a second source, such as advertisements selected by the content server 150 from among available advertisements provided by one or more content providers 130.

The publisher 120 can include a server computer or another computing device that includes a storage device on which the pieces of content 121a-121e are stored. The publisher 120 is operable to receive requests for content from the user terminal 111 and to transmit one or more computer files and/or data streams in response to each request. In some implementations, the pieces of content 121a-121e include web pages, which are transmitted to the user terminal 111 in response to a request over the network 160, which includes the Internet. The user interface 113 processes the computer files and/or data streams to create an audio/visual display of the content of a requested web page. One or more of the computer files and/or data streams includes one or more instructions that, when processed by the user terminal 111, causes the user terminal 111 to request one or more pieces of alternative content from the content server 150.

In response to receiving the request for alternative content, a selection engine 153 of the content server 150 selects an appropriate number of pieces of content for distribution to the user terminal 111 from among candidate pieces of content referenced in one or more indices, such as indices 155 and 157. In some implementations, the index 157 is a keyword-based index which is used to select pieces of alternative content based on keywords included in the request, and the index 155 is a content-based index which is used to select pieces of alternative content based on the content 115a-115c requested from the publisher 120, as indicated in the request for alternative content. With respect to selecting one or more pieces of alternative content in response to a request for alternative content, the content server 150 can operate, in some implementations, like the ADSENSE system and/or like the ADWORDS system, each operated by Google Inc. In other implementations, however, the content server 150 can select alternative content in other ways.

Generally, the content-based index 155 includes references between available pieces of alternative content and locations associated with publishers' content, such as web page addresses for web pages 121a-121e. The references are determined by the content server 150 based on contextual relationships between the publishers' content available at the locations and available pieces of alternative content. The context of the publishers' content and the available pieces of alternative content are determined based on an analysis of the content of each performed by the content server 150. For example, in an advertising environment, a copy of a web page 121a is parsed to identify the context of the web page 121a from text, hypertext links, and other content included in the web page 121a. Additionally, other signals, such as a frequency of occurrence of a text phrase, or whether the text phrase appears as a title, can be used in determining the context of the web page 121a. Many other signals may also be used in determining the context of the web page 121a.

The context of available advertisements is also determined, and matching contexts can be indicated in the content-based index 155. For example, the content provider 130 can provide, for each advertisement, selected context categories with which the advertisement is related. Additionally, or alternatively, other signals of contextual relevance can be used to determine the context of the advertisements, such as historical performance information regarding user interaction with the advertisements and the contexts of the web pages on which the advertisements appeared when an interaction occurred. In a simple example, the content-based index 155 includes, for each web page, such as the web page 121a, a ranked list of advertisements to be delivered to a reserved advertisement area of the web page. The ranked list can be updated, such as when the content of the web page changes and/or as advertisements are added or removed from the index, or as the context of the advertisements change.

The keyword-based index 157 also generally includes references between the available pieces of alternative content and the publishers' content. For example, continuing with the advertising environment, the keyword-based index 157 includes bids on keywords provided by advertisers for each advertisement, as well as indications of which keywords match each of the web pages 121a-121e of the publisher. Similar information is maintained for each publisher that uses the content server 150 to select advertisements for display on the publisher's web pages. Thus, keywords included in a request, such as keywords included in or derived from a search query, can be used to identify advertisements that have matching keyword bids. If the request does not include keywords, then the keywords matching the web page associated with the request can be used to identify advertisements that have matching keyword bids. Advertisements for distribution to the web page are selected from among the identified advertisements that have bids for keywords matching those included in the request or associated with the web page.

Regardless of the specific operation processes of the content server 150, an indication of the selected alternative content is transmitted to the user terminal 111 in response to the request for alternative content. The response includes instructions that, when executed by the user terminal 111, cause the user terminal 111 to request a copy of the selected alternative content from the content provider 130. In response to receiving the request for the selected alternative content, the content provider 130 transmits one or more computer files or data streams to the user terminal 111 that enable the user terminal 111 to output an audio and/or video display of the selected alternative content. In some implementations, the computer files or data can be stored on a storage device 135, which includes a repository for such files or data. If the content provider 130 is an advertiser, the storage device 135 includes an advertisement repository. In some implementations, the content files or data associated with the candidate pieces of alternative content can be stored on a storage device of the content server 150.

As discussed above, however, in some instances, the current context of the requested content 115a-115c at the time of a request for alternative content 117a-117c for display with the requested content 115a-115c may not be known. For example, if the content located on the web page 121a has changed subsequent to the most recent review of the web page 121a by the content server 150, then the context of the web page 121a indicated in the content-based index 155 may be inaccurate. Consequently, advertisements, or other alternative content, selected based on the context of the web page 121a indicated in the content-based index may not be contextually-relevant to the current content of the web page 121a. As a result, the selected advertisements, or other alternative content, may not be interesting or useful to the user. Similarly, the current context of a search results web page generated by the search engine 140, which includes little or no content besides the search results themselves, is also unlikely to be reflected in the content-based index 155 because the search results page may not have previously been available for analysis by the content server 150. Even for very popular search queries, where some or all of the search results may be stored, such as in a cache, for use in responding to subsequent searches, and where the stored search results have been analyzed by the content server 150 for use in selecting advertisements to include along with the search results, the current context of the search results may have changed subsequent to the last review by the content server 150.

In these situations, as well as in other situations where the current context of a web page, or other content provided by a publisher, is desired for use in selecting advertisements, or other alternative content, the current context of the web page can be identified, such as by the content server 150. For example, with reference to FIG. 2, an example process 200 is illustrated for selecting advertisements based on the current context of search results generated by the search engine provider 140. In the process 200, a user generates a search request by selecting a search query, and the user terminal 111 transmits the search request to the search engine provider 140

(201). The search request can be considered as a request for content, which is analogous to any other request for content sent to a publisher, such as the publisher 120, and the search results page which is generated by the search engine provider 140 can be considered as a piece of content, analogous to any other web page. In some implementations, for example, the search engine provider 140 can be, or be like, an Internet-based search engine operated by Google Inc.

When the search engine provider 140 receives the search request from the user terminal 111 (203), the search engine provider 140 can format the user-generated query for use by the search engine provider 140 with the search index 145 (205). For example, the search engine provider 140 may correct misspellings of terms included in the user-generated search query, add logic operators, and/or make other format adjustments. The search engine provider 140 then processes the formatted search query (207) and generates a ranked list of results (209). The search results include hypertext links, or other navigational tools, that are operable to allow the user to navigate to a web page, or other document, where content associated with the selected search result is available.

In some implementations, when the ranked list of results is available, the search engine provider 140 generates a request for advertisements which are to be displayed to the user along with the search results and transmits the request for advertisements to the content server 150 (211). When the content server 150 receives the advertisement request (213), the content server 150 selects advertisements based on information included in the request (215) and transmits a response to the search engine provider 140 including copies of the selected advertisements, or instructions for retrieving the selected advertisements (217).

Figure 3:
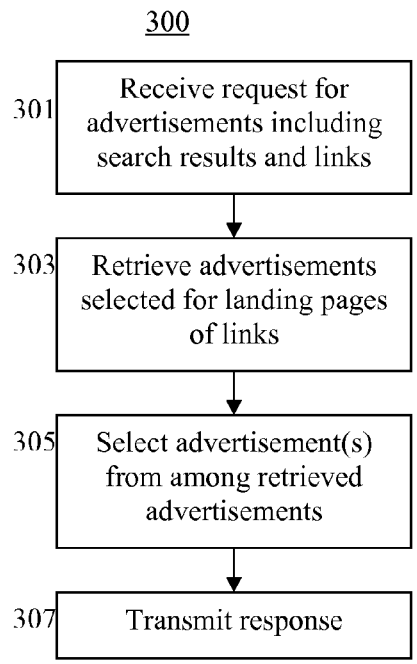
FIGS. 3-6 are diagrams illustrating processes for selecting content for distribution.

For example, as illustrated in FIG. 3, the content server 150 can perform the process 300 to select advertisements based on the current context of the search results. According to the process 300, when the content server 150 receives the request for advertisements (301), the content server 150 retrieves advertisements which were previously selected for display on the landing pages (i.e., the destination pages) of the links included in the search results (303). Thus, if the search results include three listings, where each result includes a link to a web page, the content server 150 identifies as candidate advertisements all of the advertisements previously-determined as contextually relevant to the content available on the three web pages to which links are included in the search results. The advertisements may be identified based on the references included in the content-based index 155, which, as discussed above, contains information regarding previous analysis of the content of each of the web pages and selected contextually-relevant advertisements. For example, the content server 150 may retrieve the ordered list of advertisements for each of the three web pages to which links are included in the search results. The content server 150 then selects a requested number of advertisements from among the identified candidate advertisements for delivery to the user along with the search results (305). For example, the content server 150 can select the top three most frequently occurring advertisements from among the candidate advertisements identified in the ranked lists for the three web pages, and transmit a response to the search engine provider 140 (307) that includes instructions regarding the selected advertisements and the relative positions of the selected advertisements, such that the user terminal 111 can create a display of the search results that includes the three selected advertisements in the selected relative positions, such as in a list.

Figure 4:
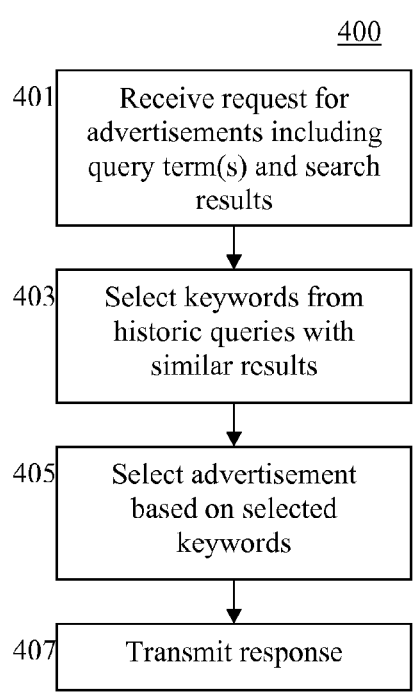

In another example, as illustrated in FIG. 4, the content server 150 can perform the process 400 to select advertisements based on the current context of the search results. According to the process 400, when the content server 150 receives the request for advertisements (301), the content server 150 selects keywords based on historic information about queries for which the search results included one or more of the search results included in the request for advertisements (403). For example, the content server 150 can maintain, in the keyword-based index 157 or elsewhere, historic information regarding previous search queries and search results returned for the previous search queries. Based on the historic information, the content server 150 can identify alternative search queries for which results were returned that are similar to the results returned for the current search query. For example, if the search query is very broad, such as a search query that includes only a single term, such as the name of a company, the search results for the very broad query may closely match search results for other queries about the company. The content server 150 can then select a requested number of advertisements from the available advertisements based on keywords included in the alternative search queries (405) and transmit a response to the search engine provider 140 including the selected advertisements (407).

Alternatively, the historic information can be maintained by the search engine provider 140, and the request for advertisements can include information regarding the alternative queries. In another example, the content server 150 can identify as candidate advertisements the advertisements selected for previous advertisement requests that included the alternative queries. The candidate advertisements can be identified based on historical information regarding previous advertisement selections that is maintained by the content server 150, for example. Thus, once the current query is identified as being related to selected previous queries based on similarities in the search results of each, the selected previous queries can be used to select advertisements that are contextually-relevant to the current context of the current query, including broad queries.

Figure 2:
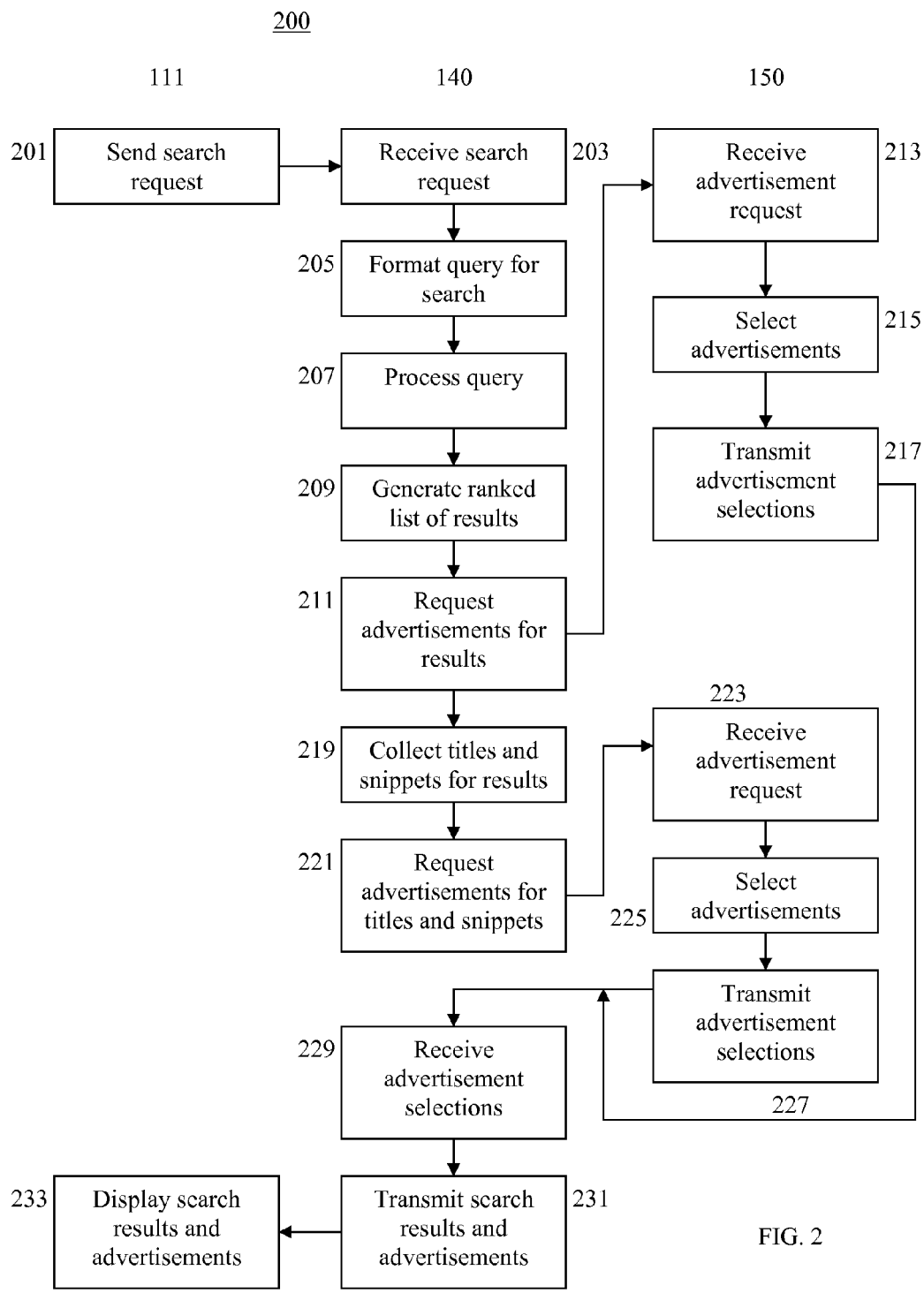
FIG. 2 is a diagram illustrating a process for distributing content.

With continued reference to FIG. 2, after requesting advertisements from the content server 150, the search engine provider 140 collects titles and snippets of content from the linked documents of the search results (or the documents otherwise referenced by the search results) for inclusion in the display of the search results (219). Thus, the titles and snippets can be collected by the search engine provider 140 at the same time as the advertisements are selected by the content server 150.

In some implementations, the search engine provider 140 generates and transmits a request for advertisements to the content server 150, where the request is based on the collected titles and snippets (221). The advertisement request based on the collected titles and snippets can be transmitted either in addition to, or instead of, the request for advertisements based on the ordered list of search results. When the content server 150 receives the request for advertisements based on the title and snippets (223), the content server selects advertisements based on the current context of the titles and snippets (225) and transmits the advertisement selections to the search engine provider 140 (227).

Figure 5:
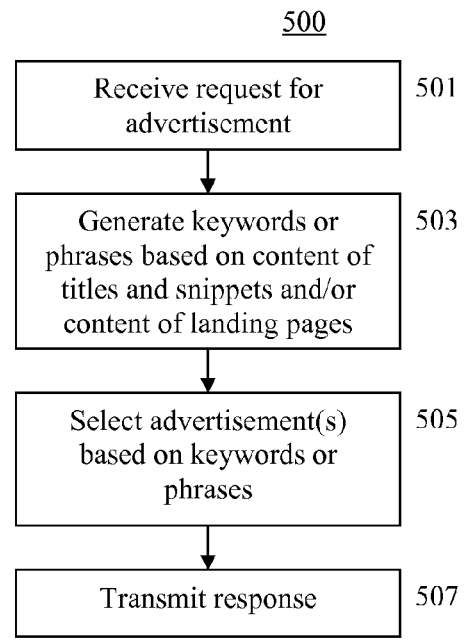

For example, the content server 150 can select advertisements based on the current context of the titles and snippets according to a process 500 that is illustrated in FIG. 5. According to the process 500, the content server 150 receives the request for advertisements from the search engine provider 140 (501), which includes the collected titles and snippets for at least some of the search results, such as the web pages referenced in the top three results of the ordered list of search results. Based on the collected titles and snippets, the content server 150 generates keywords or phrases by identifying terms included in the titles and snippets and/or by modifying the terms of the titles and snippets to create keywords or phrases (503). The generated keywords or phrases are then used to select advertisements for distribution to the user terminal 111 (505), and a response is transmitted to the search engine provider 140 that includes the selected advertisements (507).

For example, advertisements that include bid information for keywords or phrases that match one or more of the generated keywords or phrases can be identified as candidate advertisements for selection. The content server 150 can select a requested number of advertisements from among the candidate advertisements based on a bid score. The bid score can be determined based on a bid amount associated with the one or more matching keywords or phrases, as well as an indication of advertisement quality. Additionally, the advertisements can be selected on an indication of relevance of the advertisements to the matching keywords or phrases in order to improve the contextual relationship between the selected advertisements and the search results.

Again referring to FIG. 2, when the search engine provider 140 receives the selected advertisements (229), the search engine provider 140 transmits the selected advertisements to the user terminal 111 along with the search results, including the titles and snippets, and the link to the related documents (231). When the user terminal receives the search results and selected advertisements, the user terminal 111 outputs a display including the search results and the selected advertisements. The selected advertisements can include advertisements selected according to one or more of the processes described above, and/or selected according to other processes, such as an advertisement selection process that selects advertisements solely based on the user-generated search query, or an advertisement selection process that selects advertisements solely based on the content-based index 155. In some implementations, the selected advertisements include one or more advertisements selected from a group of candidate advertisements created from the results of one or more of such advertisement selection processes. Thus, the selection processes described herein can be used in combination with other selection processes.

While processes 200-500 have been described with reference to a search results web page generated by a search engine provider 140, similar processes can be used to select contextually-relevant alternative content for inclusion on web pages, or other sources of content, that are provided by other publishers, such as publisher 120. For example, publisher 120 can be a newspaper company, which publishes topical web pages, each of which relates to a selected company or industry segment. To illustrate, the newspaper company publishes a web page relating to company A, among other topic pages, each relating to other companies. On the topic page relating to company A, various information about company A is available, including current news items. While the newspaper company may wish to display advertisements on the topic page relating to company A, it may not be able to do so effectively because the current context of the topic page relating to company A may change over time. For example, as news stories about company A are released and included on the topic page, the context of at least the news story section of the topic page changes. For example, on a first day, company A may announce a new web browser program product. On that day, and perhaps for a number of days following the announcement, the primary context of the topic page relating to company A may be the new web browser product. However, when company A announces, at a later time, the release of a new cellular phone handset product, the primary context of the topic page relating to company A may then be the new cell phone handset product.

Figure 6:
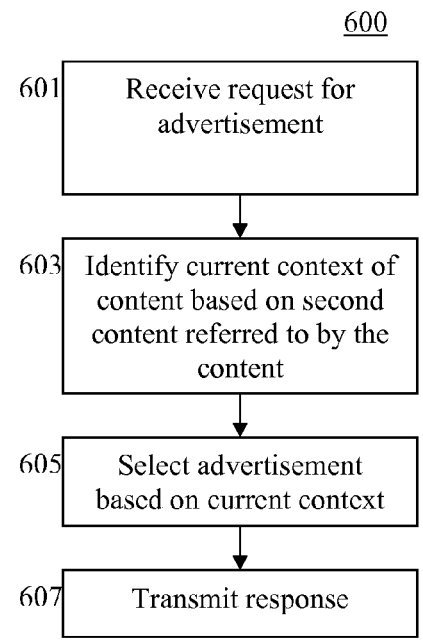

In this situation, the process 600, illustrated in FIG. 6, can be used to select advertisements for display on the topic page relating to company A. For example, when a user navigates to the topic page relating to company A, the newspaper company, either directly, or indirectly through the user terminal 111, requests advertisements for display on the topic page relating to company A from the content server 150 (601). The request can include links to web pages where the full content of articles can be found for articles relating to the news stories included on the topic page relating to company A. In response to receiving the request, the content server can identify the current context of the topic page relating to company A based on the links included in the request (603). Additionally, or alternatively, the request can include other references to content included on the topic page relating to company A. For example, the content server 150 can identify previously-selected advertisements that are contextually relevant to the linked web pages where the full content of the articles is available. Additionally, or alternatively, the content server 150 can identify keywords or phrases contained in full content of the articles. The identified advertisements and/or keywords or phrases can be used to select advertisements (605) and a response that includes or indicates the selected advertisements can be transmitted to the user terminal 111 or the publisher 120 (607). By selecting advertisements from among the identified advertisements that are contextually-relevant to the linked web pages, and/or by using keywords or phrases included in the full content of the articles, the selected advertisements are contextually related to the current context of the topic page relating to company A regardless of when and how frequently the context of the content of the topic page relating to company A changes.

The processes described above, and other similar processes, can additionally be used in other situations to select advertisements or other alternative content based on the current context of content available at a location, where the current context is identified based on references to second content sources or pieces of content. For example, search results for searches of blog postings, status update postings, or other current publications, such as Tweets published by Twitter, Inc., can be supplemented with alternative content selected based on references to second content sources or pieces of content included in the search results or included in documents referenced in the search results, including linked documents.

While some implementations are described above, these should not be viewed as exhaustive or limiting, but rather should be viewed as exemplary, and included to provide descriptions of various features. It will be understood that various modifications may be made without departing from the spirit and scope of the invention. For example, the functions described with regard to one or more components of the system 100 can be performed by one or more different components, sub-components, or combination of components of the system 100, among components. Similarly, while the components of the system 100 have been described as separate, each component can be a sub-component of another combination of components, and may include its own sub-components, which have not specifically been illustrated or described.

Accordingly, other implementations are within the scope of the following claims.

The invention claimed is:

1. A computer-implemented method comprising:
   receiving, by one or more processors, a request for content, the request including a search query and search results that are responsive to the search query;
   identifying previous search queries whose search results included one or more of the search results;
   identifying, by the one or more processors, keywords that are (i) included in the previous search queries and (ii) different than terms in the search query;
   selecting, by the one or more processors, the content based at least in part on the keywords; and
   providing, by the one or more processors and in response to the request for content, the selected content.

2. The method of claim 1, wherein the request for content includes the previous queries whose search results included the one or more of the search results.

3. The method of claim 1, wherein selecting the content based at least in part on the keywords comprises:
   selecting the content further based on previous content that was associated with the previous search queries.

4. The method of claim 1, wherein the request for content includes titles and snippets from the search results that are responsive to the search query.

5. The method of claim 4, wherein selecting the content based at least in part on the keywords comprises:
   selecting the content further based on the titles and the snippets from the search results that are responsive to the search query.

6. The method of claim 1, comprising:
   receiving data associated with user interaction with web pages that displayed the content.

7. The method of claim 6, wherein selecting the content based at least in part on the keywords comprises:
   selecting the content further based on the data associated with user interaction with the web pages that displayed the content.

8. The method of claim 1, wherein the search query and the previous search queries are entered by a same user.

9. A non-transitory computer-readable medium storing software comprising instructions executable by one or more computers which, upon such execution, cause the one or more computers to perform operations comprising:
   receiving, by one or more processors, a request for content, the request including a search query and search results that are responsive to the search query;
   identifying previous search queries whose search results included one or more of the search results;
   identifying, by the one or more processors, keywords that are (i) included in the previous search queries and (ii) different than terms in the search query;
   selecting, by the one or more processors, the content based at least in part on the keywords; and
   providing, by the one or more processors and in response to the request for content, the selected content.

10. The medium of claim 9, wherein the request for content includes the previous queries whose search results included the one or more of the search results.

11. The medium of claim 9, wherein selecting the content based at least in part on the keywords comprises:
    selecting the content further based on previous content that was associated with the previous search queries.

12. The medium of claim 9, wherein the request for content includes titles and snippets from the search results that are responsive to the search query.

13. The medium of claim 12, wherein selecting the content based at least in part on the keywords comprises:
    selecting the content further based on the titles and the snippets from the search results that are responsive to the search query.

14. The medium of claim 9, wherein the operations further comprise:
    receiving data associated with user interaction with web pages that displayed the content.

15. The medium of claim 14, wherein selecting the content based at least in part on the keywords comprises:
    selecting the content further based on the data associated with user interaction with the web pages that displayed the content.

16. A system comprising:
    one or more computers and one or more storage devices storing instructions that are operable, when executed by the one or more computers, to cause the one or more computers to perform operations comprising:
    receiving, by one or more processors, a request for content, the request including a search query and search results that are responsive to the search query;
    identifying previous search queries whose search results included one or more of the search results;
    identifying, by the one or more processors, keywords that are (i) included in the previous search queries and (ii) different than terms in the search query;
    selecting, by the one or more processors, the content based at least in part on the keywords; and
    providing, by the one or more processors and in response to the request for content, the selected content.

17. The system of claim 16, wherein the request for content includes the previous queries whose search results included the one or more of the search results.

18. The system of claim 16, wherein selecting the content based at least in part on the keywords comprises:
    selecting the content further based on previous content that was associated with the previous search queries.

19. The system of claim 16, wherein the request for content includes titles and snippets from the search results that are responsive to the search query.

20. The system of claim 19, wherein selecting the content based at least in part on the keywords comprises:
    selecting the content further based on the titles and the snippets from the search results that are responsive to the search query.

21. The system of claim 16, wherein the operations further comprise:
    receiving data associated with user interaction with web pages that displayed the content.

* * * * *